United States Patent Office 2,756,231
Patented July 24, 1956

2,756,231

DERIVATIVES OF 4,4'-DICARBETHOXY-1,1'-ETH-YLENEDIPIPERAZINE AND THEIR SALTS

Frederick L. Bach, Jr., and Herbert J. Brabander, Pearl River, and Samuel Kushner, Nanuet, N. Y., assignors to American Cyanamid Company, New York, N. Y., a corporation of Maine No Drawing. Application September 10, 1954, Serial No. 455,344

17 Claims. (Cl. 260—268)

This invention relates to a new series of organic compounds. More particularly, this invention is concerned with certain derivatives of 4,4'-disubstituted-1,1'-ethylenedipiperazines, salts thereof and methods for their preparation.

The compounds of the present invention are useful as antispasmodics and gastric inhibitors. They are viscous, oily, liquids at room temperature, white to light-yellow in color. In their basic form they are soluble in most organic solvents but are only slightly soluble in water. Both the mineral acid and quaternary ammonium salts are water soluble, the latter being particularly characterized by their hygroscopicity and difficulty of recrystallization.

The compounds of this invention are those having the following general formula:

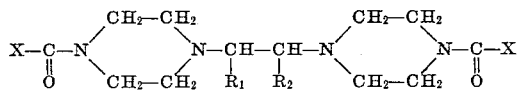

wherein X is a lower alkyl, lower alkylamino, di(lower alkyl substituted) tertiary amino or lower alkoxy substituent. As examples of these may be given —CH₃, —C₂H₅, —C₃H₇, —CH₂CH₂N(C₂H₅)₂, —N(C₂H₅)₂, —N(C₃H₇)₂, —OCH₃, —OC₂H₅, —OC₃H₇, and —OC₄H₉. R₁ in the above general formula is a member of the group consisting of lower alkyl, aryl, substituted aryl, hydroxy lower alkyl, aralkyl, carbalkoxy, carboxy and carboxamido radicals. R₂ is a member selected from the group consisting of hydrogen atoms and lower alkyl radicals. Suitable examples of specific substituents are as follows: lower alkyl—methyl, ethyl, propyl, butyl, pentyl, and hexyl; aryl—phenyl; substituted aryl—p-chlorophenyl, p-acetamidophenyl, p - methoxyphenyl; hydroxyalkyl — hydroxymethyl, hydroxyethyl, hydroxypropyl; aralkyl—benzyl, p-chlorobenzyl, p-methoxybenzyl; carbalkoxy—carbethoxy. The carboxy and carboxamido derivatives may be readily obtained from the carbalkoxy derivatives. Their respective preparation is discussed more fully below.

Although various methods may occur to those skilled in the art for preparing the compounds of this invention, we have discovered a particularly novel and useful method, and it is intended that this method be included within the scope of the present invention. In a general way, our method comprises the step of reacting a 1-substituted piperazine with a vicinal dihaloalkane in the presence of a suitable organic or inorganic base. It is preferred, although not essential, to perform the reaction in the presence of an inert organic solvent. Any alkali metal carbonate, bicarbonate or hydroxide may be used as the base for this reaction. In addition, the alkali metal amides may be used, as for example, sodamide or potassium amide.

Among the solvents which may be employed in this reaction are the lower alkyl alcohols such as methanol, ethanol, propanol, benzene, toluene, chlorobenzene, dioxane and aqueous-alcoholic mixtures. In addition, organic bases such as pyridine, triethylamine and the like may be used. These latter compounds have the advantage of serving both as solvents and acid acceptors for neutralizing the acid formed during the course of the reaction.

Although our preferred mode of carrying out the reaction is one in which an organic solvent is employed, it is possible to carry out the condensation in the absence of such solvent. An excess quantity of piperazine starting material is used in such cases. The piperazine, being basic in character, acts as the acid acceptor in lieu of the organic solvent.

We prefer to carry out the reaction at reflux temperatures in order to minimize the time required for the reaction to reach completion. Although lower temperatures, such as room temperature, are suitable, a longer period of time may be required in such cases if such conditions are employed. A period of about 1 to 15 hours is sufficient when the reaction is carried out at reflux temperature, whereas a week or more may be required at room temperature. If the reaction is carried out at reflux in the absence of a solvent, the solids are fused before being subjected to refluxing.

The quaternary or mineral acid salts of the compounds of the present invention may be readily prepared by methods known to those skilled in the art. For example, the basic dipiperazine compound may be treated with two molar equivalents of an alkyl halide such as methyliodide in the presence of an inert organic solvent in which the base is soluble, for example ether, benzene, chloroform, or the like. Upon standing at room temperature for a period of about 1 hour to 3 days, depending upon the nature of the base used, the quaternary salt is deposited from solution. Similarly, treatment of the dipiperazine base with 2 molar equivalents of a mineral acid such as hydrochloric, hydrobromic, sulfuric or phosphoric acid results in the formation of the corresponding salt. In some cases an ethereal or chloroformic solution of the basic material can be treated with a dry, hydrohalogen gas to obtain the desired salt.

The methods usually employed for extraction of basic organic materials from their by-products may be employed for the separation of the dipiperazine of the present invention at the conclusion of the reaction. A preferred method is to separate the organic liquid phase from the insoluble material, concentrate the organic phase under reduced pressure and then treat with a suitable non-hydroxylic solvent such as ether or chloroform. The ether or chloroform extract may then be fractionated under reduced pressure to yield the desired product. The compounds of the present invention are, in general, fairly high boiling materials.

In accordance with the above-outlined procedure, one may obtain an α-lower carbalkoxy-4,4'-disubstituted-1,1'-ethylenedipiperazine by treatment of a 1-substituted piperazine with the ethyl ester of α,β-dibromopropionate under suitable reaction conditions such as those disclosed above. The corresponding carboxy derivative may then be obtained by hydrolysis of the ester with a mineral acid under reflux conditions, the product coming down as the dihydrochloride. In turn, the carboxamide derivative may be recovered by treatment of the ester with ammonia, either in the gaseous form or in concentrated solution.

The invention will be more fully illustrated by the following examples which are intended to be illustrative but not limitative upon the scope thereof. All parts are by weight unless otherwise indicated.

Example I

A mixture consisting of 15 grams of 1,2-dibromopropane, 23.5 grams of 1-carbethoxypiperazine and 12.5 grams of sodium bicarbonate in 100 ml. of dry toluene was refluxed for 15 hours. After this time, the toluene was decanted from the insoluble material and concentrated under reduced pressure to a brown, oily residue. This crude material was made basic with 5 ml. of concentrated potassium hydroxide solution, and the organic material was extracted with 50 ml. portions of ether. The ether extracts were combined and concentrated under vacuum to a light-yellow oil which was fractionated to yield α - methyl - 4,4'-dicarbethoxy-1,1'-ethylenedipiperazine, boiling at 225° C. to 230° C., 0 to 1 mm. pressure.

*Example II*

20 grams of 2,3-dibromobutane, 28.4 grams of 1-carbethoxypiperazine and 15.2 grams of sodium bicarbonate were refluxed in 150 ml. of toluene for 15 hours. The crude reaction product was obtained by decanting the toluene from the insoluble material and concentrating the decanted material under reduced pressure. The material obtained in this manner was semi-crystalline, and when treated with ether yielded the colorless mono-hydrobromide of 1-carbethoxypiperazine. The ether extract was treated with activated charcoal, dried over anhydrous sodium sulfate and then concentrated to a viscous, light-yellow oil. The oil was subjected to a high vacuum distillation, yielding α,β - dimethyl-4,4'-dicarbethoxy - 1,1'-ethylenedipiperazine, boiling at 220–230° C./0.4–0.5 mm.

*Example III*

An 8.1 gram quantity of 1,2-dibromobutane was refluxed for 15 hours with 11.8 grams of 1-carbethoxypiperazine, 6.3 grams of sodium carbonate and 100 ml. of ethanol. The crude product was extracted with chloroform and the combined extracts were concentrated to a brown oil. The oily residue was fractionated under reduced pressure, the portion boiling at 208° C. to 220° C., 1 to 2 mm. pressure, yielding α-ethyl-4,4'-dicarbethoxy-1,1'-ethylenedipiperazine.

*Example IV*

A mixture consisting of 15.8 grams of 1-carbethoxypiperazine, 26.4 grams of 1,2-dibromoethylbenzene, 16.8 grams of sodium bicarbonate and 150 ml. of ethanol was refluxed for 15 hours. After this period of time, the volatile materials were distilled under vacuum at water-bath temperature. A brown residue was taken up in chloroform, treated with activated charcoal, and concentrated in a distilling flask to a yellow-brown, viscous oil. This material was distilled under reduced pressure and the product, α-phenyl-4,4'-dicarbethoxy-1,1'-ethylenedipiperazine, was collected at 220° C. to 230° C., 0.5 to 1.0 mm. pressure.

*Example V*

9 grams of the basic α-phenyl-4,4'-dicarbethoxy-1,1'-ethylenedipiperazine obtained as shown in Example IV was taken up in 50 ml. of dry ether, chilled in an ice bath to 10° C. and then treated with an excess of dry hydrogen chloride gas. A white, granular precipitate was immediately deposited. This material, the hydrochloride salt of α-phenyl-4,4'-dicarbethoxy-1,1'-ethylenedipiperazine, was collected and dried over solid potassium hydroxide under reduced pressure; M. P. 220° C. to 222° C. (dec.).

*Example VI*

A quantity of α-methyl-4,4'-dicarbethoxy-1,1'-ethylenedipiperazine may be dissolved in ether and treated with 2 molar equivalents of methyl iodide. After 3 hours the solution will deposit a white crystalline quaternary salt of α-methyl-4,4'-dicarbethoxy-1,1'-ethylenedipiperazine.

*Example VII*

3.7 grams of α,β - dimethyl - 4,4' - dicarbethoxy-1,1'-ethylenedipiperazine was treated with 2.0 ml. of 10 N hydrochloric acid and this mixture was diluted with 20 ml. of water, treated with activated charcoal and evaporated to dryness. The dihydrochloride obtained in this manner was a hygroscopic solid.

Further examples illustrative of the 4,4'-disubstituted-1,1'-ethylenedipiperazines of our invention are:

α-methyl-4,4'-diacetyl-1,1'-ethylenedipiperazine;
α,β-dimethyl-4,4'-dipropionyl-1,1'-ethylenedipiperazine;
α-ethyl-4,4'-dibutyryl-1,1'-ethylenedipiperazine;
α - methyl - 4,4' - bis - (3 - diethylaminopropionyl) - 1,1' - ethylenedipiperazine;
α,β - dimethyl - 4,4' - bis - (3 - dipropylaminopropionyl) - 1,1'-ethylenedipiperazine;
α-methyl-4,4'-bis-(diethylcarbamyl) - 1,1' - ethylenedipiperazine;
α-ethyl-4,4'-bis-(dipropylcarbamyl - 1,1' - ethylenedipiperazine;
α-methyl-4,4'-dicarbopropoxy-1,1'-ethylenedipiperazine;
α,β - dimethyl - 4,4' - dicarbobutoxy - 1,1'' - ethylenedipiperazine;
α - methyl - β - ethyl - 4,4' - dicarbethoxy - 1,1' - ethylenedipiperazine;
α - ethyl - β - propyl - 4,4' - diacetyl - 1,1' - ethylenedipiperazine;
α,β - diethyl - 4,4' - dipropionyl - 1,1' - ethylenedipiperazine;
α,β - dipropyl - 4,4' - bis - (3 - diethylaminopropionyl) - 1,1'-ethylenedipiperazine;
α - methyl - β - propionyl - 4,4' - dibutyryl - 1,1' - ethylenedipiperazine;
α - p - chlorophenyl - 4,4' - bis - (3 - dipropylaminopropionyl)-1,1'-ethylenedipiperazine;
α - p - methoxyphenyl - 4,4' - bis-(diethylcarbamyl) - 1,1'-ethylenedipiperazine;
α - p - ethoxyphenyl - 4,4' - bis - (dipropylcarbamyl) - 1,1'-ethylenedipiperazine;
α - p - acetamidophenyl - 4,4' - dicarbopropoxy - 1,1' - ethylenedipiperazine;
α - hydroxymethyl-4,4'-dicarbethoxy-1,1'-ethylenedipiperazine;
α-hydroxyethyl-4,4'-diacetyl-1,1'-ethylenediperazine;
α - hydroxypropyl - 4,4' - dipropionyl - 1,1' - ethylenedipiperazine;
α-benzyl-4,4'-dibutyryl-1,1'-ethylenedipiperazine;
α - p - chlorobenzyl - 4,4' - bis - (3 - diethylaminopropionyl)-1,1'-ethylenedipiperazine;
α - p - methoxybenzyl - 4,4' - bis - (3 - dipropylaminopropionyl)-1,1'-ethylenedipiperazine;
α-methyl-4,4'-dicarboxy-1,1'-ethylenedipiperazine;
α,β - dimethyl - 4,4'-dicarboxamido-1,1'-ethylenedipiperazine;
α - methyl - β-ethyl-4,4'-dicarboxy-1,1'-ethylenedipiperazine;
α-phenyl-4,4'-dicarboxamido-1,1'-ethylenedipiperazine;

the dihydrochloride and quaternary salts of these compounds, prepared in accordance with the methods of Examples 5, 6 and 17, respectively.

We claim:
1. Compounds selected from the group consisting of those having the following general formula:

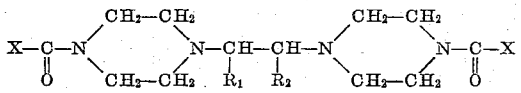

wherein X is a lower alkoxy radical, $R_1$ is a member selected from the group consisting of lower alkyl, and phenyl radicals, and $R_2$ is a member of the group consisting of hydrogen atoms and lower alkyl radicals, the therapeutically useful salts thereof.

2. The α-lower alkyl - 4,4'-dicarbethoxy-1,1'-ethylenedipiperazines.

3. The α,β - di - lower - alkyl - 4,4' - dicarbethoxy-1,1'-ethylenedipiperazines.

4. The α - lower - alkyl - 4,4'-dicarb lower alkoxy-1,1'-ethylenedipiperazines.

5. The compound α - methyl - 4,4'-dicarbethoxy-1,1'-ethylenedipiperazine.

6. The compound α,β-dimethyl-4,4'-dicarbethoxy-1,1'-ethylenedipiperazine.

7. The compound α-ethyl-4,4'-dicarbethoxy-1,1'-ethylenedipiperazine.

8. The compound α-phenyl-4,4'-dicarbethoxy-1,1'-ethylenedipiperazine.

9. The α-lower-alkyl-4,4'-dicarbethoxy-1,1'-ethylenedipiperazine quaternary ammonium salts.

10. A method for preparing compounds having the general formula:

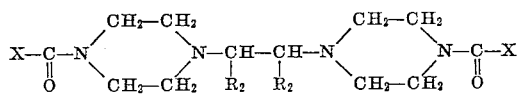

wherein X is a lower alkoxy radical, $R_1$ is a member selected from the group consisting of lower alkyl, and phenyl radicals, and $R_2$ is a member of the group consisting of hydrogen atoms and lower alkyl radicals, which comprises the steps of treating a vicinal dihaloloweralkane with a 1-substituted piperazine wherein the said substituent in the 1-position is a lower carbalkoxy radical, in the presence of a base.

11. A method as set forth in claim 10 wherein the dihaloloweralkane is a member selected from the group consisting of dichloroloweralkanes and dibromoloweralkanes.

12. A method as set forth in claim 10 wherein the base is an alkali metal salt selected from the group consisting of carbonates, bicarbonates and hydroxides.

13. A method as set forth in claim 10 wherein the reaction takes place in the presence of an inert non-hydroxylic organic solvent.

14. A method for preparing α-methyl-4,4'-dicarbethoxy-1,1'-ethylenedipiperazine which comprises treating 1-carbethoxypiperazine with 1,2-dibromopropane in the presence of a base.

15. A method for preparing α,β-dimethyl-4,4'-dicarbethoxy-1,1'-ethylenedipiperazine which comprises treating 1-carbethoxypiperazine with 2,3-dibromobutane in the presence of a base.

16. A method for preparing α-ethyl-4,4'-dicarbethoxy-1,1'-ethylenedipiperazine which comprises treating 1-carbethoxypiperazine with 1,2-dibromobutane in the presence of a base.

17. A method for preparing α-phenyl-dicarbethoxy-1,1'-ethylenedipiperazine which comprises treating 1-carbethoxypiperazine with 1,2-dibromoethylbenzene in the presence of a base.

References Cited in the file of this patent

Stewart et al.: J. Org. Chem. 13, 139 and 141 (1948).